C. G. CONDIT.
LIQUID AND GASOLENE GAGE.
APPLICATION FILED JAN. 21, 1913.

1,101,409.

Patented June 23, 1914.

2 SHEETS—SHEET 2.

Witnesses

Inventor
C. G. Condit.

By Victor J. Evans,
Attorney

UNITED STATES PATENT OFFICE.

CLARE G. CONDIT, OF TOLEDO, OHIO.

LIQUID AND GASOLENE GAGE.

1,101,409.

Specification of Letters Patent.

Patented June 23, 1914.

Application filed January 21, 1913. Serial No. 743,380.

*To all whom it may concern:*

Be it known that I, CLARE G. CONDIT, a native-born citizen of the United States, residing at Toledo, in the county of Lucas and State of Ohio, have invented new and useful Improvements in Liquid and Gasolene Gages, of which the following is a specification.

This invention is an improved gage for indicating the quantity of liquid in a tank, or other container so as to enable the amount of liquid in such a tank to be readily ascertained at all times, the invention being especially adapted for use in connection with gasolene tanks of automobiles but also adapted for use in other similar connections, the object of the invention being to provide an improved gage of this character which is cheap and simple, is strong and durable, is not likely to get out of order, is accurate and which may be readily placed in and detached from a tank.

The invention consists in the construction, combination and arrangement of devices hereinafter described and claimed.

Figure 1:
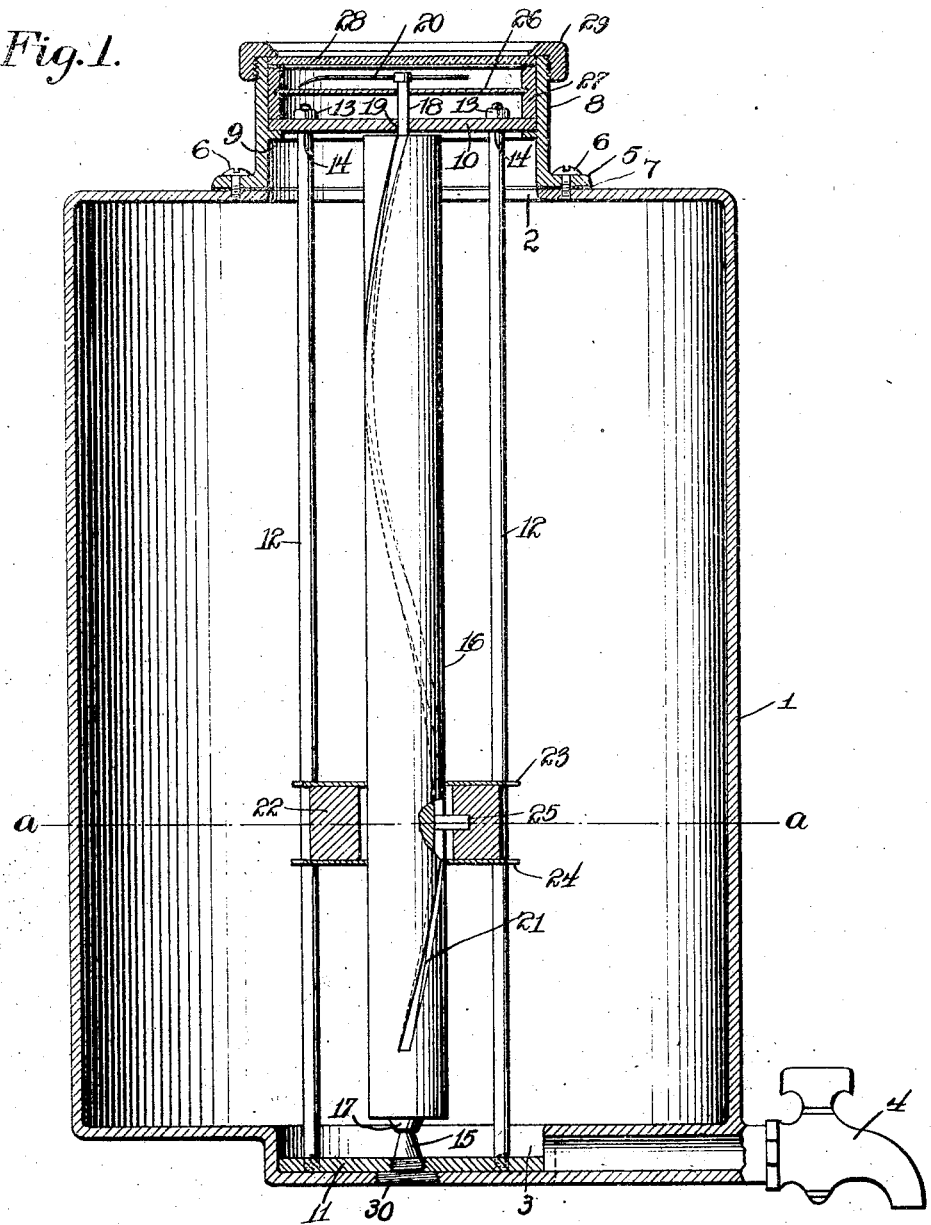
Figure 2:
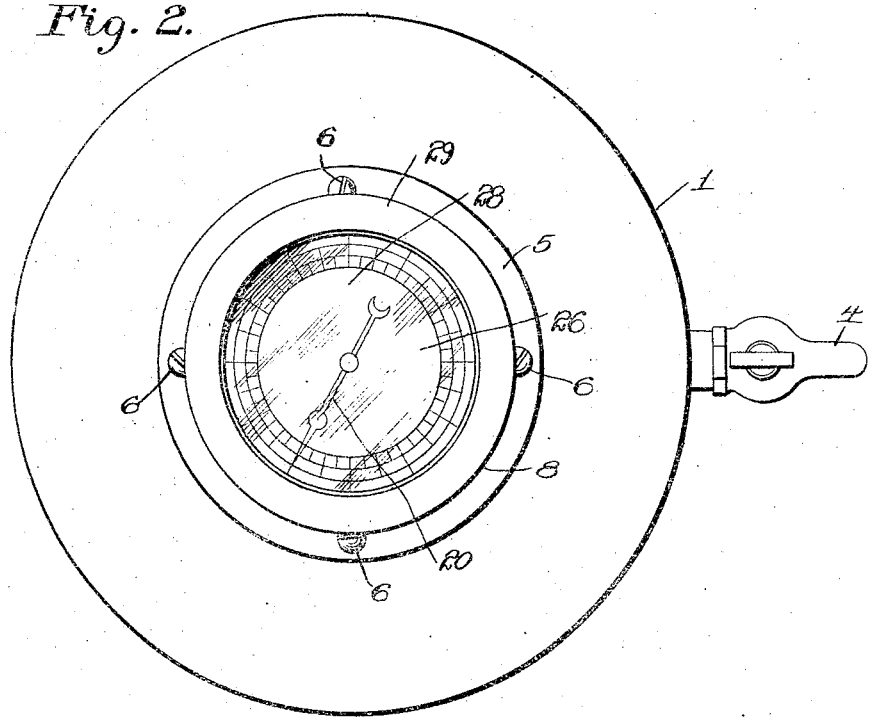
Figure 3:
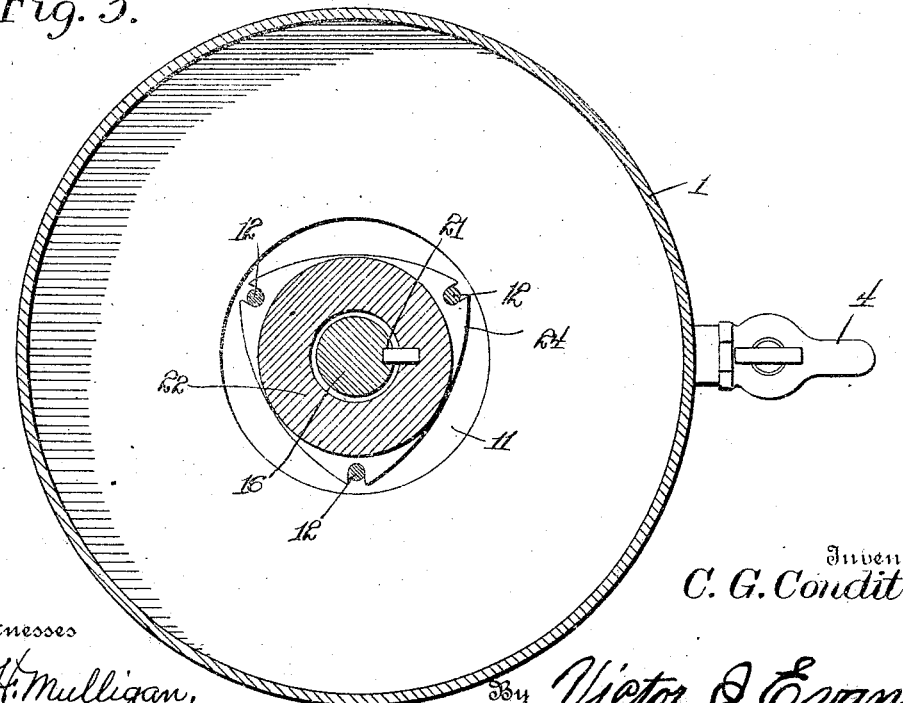

In the accompanying drawings:—Figure 1 is a vertical central sectional view of a gage constructed in accordance with my invention, showing the same in use in a tank. Fig. 2 is a plan view of the same. Fig. 3 is a horizontal sectional view of the same on the plane indicated by the line *a—a* of Fig. 1.

For the purposes of this specification, a tank is indicated at 1 provided with a top having an opening 2 and at its bottom with a well 3, which extends a suitable distance below the bottom. The well is here shown as provided with a faucet 4.

In accordance with my invention I provide a casing 5 which has a base flange and is secured as by means of bolts 6 to the top of the tank, a packing ring 7 being interposed between the top of the tank and the base flange or lower side of the casing. The casing has an upwardly extending cylindrical wall 8 which is provided upon its interior about midway between its upper and lower edges with an inwardly extending annular flange 9.

A top plate 10 rests on this flange and is connected to the bottom 11 by means of a series of guide and connecting rods 12 of which any suitable number may be employed, three being here shown. The lower end of each of these rods is screwed in an opening in the bottom plate and the upper end of each rod passes through an opening in the top plate and is secured thereon by means of a nut 13, each rod preferably having a stop shoulder 14 to engage the under surface of the top plate. The bottom plate is of such diameter as to enable it to be placed in the well 3 of the tank and in the center of the bottom plate is a step bearing 15 which is screwed in a threaded opening in the bottom plate.

A barrel arbor 16 has its lower end stepped as at 17 on the upper end of the step bearing 15. The barrel arbor has a stem 18 at its upper end which passes up through a bearing opening 19 in the center of the top plate 16 and to the upper end of the said stem is screwed or otherwise suitably and removably secured an indicating hand 20 which is turned with and by the barrel arbor. The barrel arbor also has a spiral groove 21 in its periphery which extends nearly from the bottom of the barrel arbor to the top thereof and makes one complete revolution.

A float 22 which is cylindrical in form is provided with upper and lower flanges 23 and 24 which project therefrom and have slots through which the rods 12 extend so that the said float is guided and held in place on the said rods for vertical movement. The float has a central opening through which the barrel arbor extends and also has an inwardly projecting tappet pin 25 which engages the groove 21 of the barrel arbor.

The guide rods 12 prevent the float from turning, as will be understood and vertical movement of the float occasioned by variations in the height of the column of gasolene or other liquid contents of the tank cause the float through the instrumentality of the tappet pin 25 and the spiral cam groove 21 to turn or partly turn the barrel arbor 16, as the case may be, and, hence, the barrel arbor actuates the indicating hand 20.

A dial 26 which is suitably inscribed with units of measure according to the capacity of the tank is arranged above the top plate 10 and has its periphery engaged in a groove in a ring 27 which bears on said top plate and spaces the dial therefrom, the said ring also extending upwardly from the dial to a point above the indicating hand. A glass or other suitable transparent cover 28 is placed in the upper end of the casing formed by the wall 8, bears on the ring 27 of the dial and is detachably secured in place by a cap ring 29 which is secured on the upper end of said casing 8. A screw plug 30 is here shown in the bottom of the well of the tank and under the step bearing 15.

It will be understood from the foregoing description and by reference to the drawing that all the parts of the gage are connected to the casing 5 and that the gage may be readily attached to and removed from a tank or other suitable container, it being only necessary to secure the bolts 6 in order to fasten the gage devices on a tank.

While I have herein shown and described a preferred form of my invention, I would have it understood that changes may be made in the form, proportion and construction of the several parts without departing from the spirit of my invention and within the scope of the appended claim.

I claim:—

A liquid gage of the class described comprising a casing adapted to be secured on the top of a tank or other container and having a flange on its inner side, a guide frame comprising a top plate detachably mounted in the casing and bearing on the said flange, a bottom plate and guide rods extending downwardly from the top plate, to the bottom plate, a barrel arbor having a bearing on the bottom plate and having a stem at its upper end mounted in a bearing in the top plate and projecting upwardly therefrom, the said arbor being provided with a peripheral spiral groove, a float guided vertically on the guide rods having an opening through which the arbor extends and also having a tappet pin engaging the spiral groove of the arbor, a ring in the casing and bearing on the top plate, a dial carried by the said ring and spaced between the upper and lower sides thereof, the said dial having a central opening through which the upper portion of the stem of the arbor extends, an indicating hand on the upper end of the stem, a transparent cover in the upper side of the casing and bearing on the said ring, and a cap ring secured on the upper end of the casing and bearing on the cover and holding the latter in place.

In testimony whereof I affix my signature in presence of two witnesses.

CLARE G. CONDIT.

Witnesses:
ROBERT I. GILMARTIN,
FRANK L. COLLINS.